United States Patent
Pan (10) Patent No.: US 8,166,539 B2
(45) Date of Patent: Apr. 24, 2012

(54) AUTHENTICATION OF BASEBOARD MANAGEMENT CONTROLLER USERS IN A BLADE SERVER SYSTEM

(75) Inventor: Weimin Pan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1047 days.

(21) Appl. No.: 11/361,576

(22) Filed: Feb. 24, 2006

(65) Prior Publication Data

US 2007/0204332 A1 Aug. 30, 2007

(51) Int. Cl.
G06F 21/00 (2006.01)
(52) U.S. Cl. .................. 726/16; 726/17; 709/224
(58) Field of Classification Search .......... 726/4, 5, 726/16, 17; 709/224
See application file for complete search history.

(56) References Cited

U.S. PATENT DOCUMENTS

| 7,069,349 | B2 | 6/2006 | Hawkins et al. | 710/15 |
| 7,072,945 | B1 | 7/2006 | Nieminen et al. | 709/217 |
| 2003/0131113 | A1* | 7/2003 | Reeves et al. | 709/229 |
| 2005/0028000 | A1* | 2/2005 | Bulusu et al. | 713/200 |
| 2005/0076107 | A1* | 4/2005 | Goud et al. | 709/223 |
| 2005/0216627 | A1* | 9/2005 | Goud et al. | 710/100 |
| 2005/0267975 | A1* | 12/2005 | Qureshi et al. | 709/229 |
| 2006/0015861 | A1* | 1/2006 | Takata et al. | 717/168 |
| 2006/0031447 | A1* | 2/2006 | Holt et al. | 709/223 |
| 2006/0218326 | A1* | 9/2006 | Tanaka | 710/104 |
| 2007/0101022 | A1* | 5/2007 | Schulz et al. | 709/244 |
| 2007/0143606 | A1* | 6/2007 | Bandholz et al. | 713/168 |

OTHER PUBLICATIONS

Intel Hewlett-Packard NEC Dell, Intelligent Platform Management Interface Specification, Jun. 1, 2004, V2.0 Ducument revision 1.0, 291-292.*

"Microsoft® Computer Dictionary, Fifth Edition," May 1, 2002, Microsoft Press, pp. 235 and 272.*

* cited by examiner

Primary Examiner — Kambiz Zand
Assistant Examiner — Michael Guirguis
(74) Attorney, Agent, or Firm — Baker Botts L.L.P.

(57) ABSTRACT

User authorization and access information may be stored in a remote assistant card or chassis management module (CMM). The CMM may be in communication with each baseboard management controller (BMC) in a blade server system. Each BMC may authenticate its authorized users from the CMM using a simple user authorization retrieval command, e.g., IPMI Get Auth Code command. When an administrator wants to add or delete a user, the CMM may be updated instead of having to update each blade BMC. Each user may have a privilege list for any or all of the blades in the blade server system. This privilege list may define which user(s) apply to which blades, input-output (I/O) modules, and/or blade server system chassis.

16 Claims, 6 Drawing Sheets

Figure 3 (Prior Technology)

AUTHENTICATION OF BASEBOARD MANAGEMENT CONTROLLER USERS IN A BLADE SERVER SYSTEM

TECHNICAL FIELD

The present disclosure relates generally to information handling systems and, more particularly, to information handling systems having authentication of baseboard management controller users in a blade server system.

BACKGROUND

As the value and use of information continues to increase, individuals and businesses seek additional ways to process and store information. One option available to users are information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

An information handling system is powered from a power supply system that receives and converts alternating current (AC) power to direct current (DC) power at utilization voltages required by the electronic modules comprising the information handling system. The power supply system tightly regulates these utilization voltages and incorporates over current protection for each of the voltages. To further provide increased reliability of the power supply system, a plurality of power supply units (PSU) may be provided and coupled in parallel so that the loss or malfunction of one or more of the PSUs will not totally disable operation of the information handling system.

As consumer demand increases for smaller and denser information handling systems, manufacturers strive to integrate more computer components into a smaller space. This integration has led to the development of several applications, including high density servers. A high density server provides the computer processing resources of several computers in a small amount of space. A typical arrangement for a high density server includes a shared power supply system, a management module, a connection board (e.g., a back-plane or mid-plane) and server modules, such as blade server modules.

Blade server modules, or "blades," are miniaturized server modules that typically are powered from a common power supply system and are cooled by cooling system within a multi-server cabinet. Typically, a blade includes a circuit board with one or more processors, memory, a connection port, and possibly a disk drive for storage. By arranging a plurality of blades like books on a shelf in the multi-server cabinet, a high density multi-server system achieves significant cost and space savings over a plurality of conventional servers. These savings result directly from the sharing of common resources (e.g., power supplies, cooling systems, enclosures, etc.,) and the reduction of space required by this type of multi-server system while providing a significant increase in available computer processing power.

Each blade may have a baseboard management controller (BMC). The BMC may offer an intelligent platform management interface (IPMI) having out-of-band (OOB) access over an interface port, e.g., local area network (LAN), serial over LAN (SOL), etc. This interface port may allow a user to locally or remotely manage the blade. Each BMC may have a database for storing all user information required for remote access authentication.

SUMMARY

If an administrator wants to add an additional user(s) to a blade server system, information for each user(s) has to be added to all of the BMCs, each of the BMCs being associated with a respective blade. However, due to cost constraints, a typical BMC has very limited resources, e.g., small electrically erasable and programmable memory (EEPROM), small Flash memory, etc. Therefore, the BMC may only store very small amounts of information about authorized users and does not have the capacity to offer more advanced user authentication, e.g., ACTIVE DIRECTORY® (a registered trademark of Microsoft Corp., One Microsoft Way, Redmond, Wash. 98052). Therefore what is needed is the ability to retain a sufficient amount of information so that advanced user authentication may be used for a plurality of users without increasing the cost and/or complexity of individual BMCs in a blade server system.

According to teachings of this disclosure, information for all BMC users may be stored in a remote assistant card or chassis management module (hereinafter "CMM"). Only one CMM is required and may be in communication with all of the BMCs in the blade server system. Each BMC in the blade server system authenticates its authorized users from the CMM using a simple user authorization retrieval command, e.g., IPMI Get Auth Code command. The CMM may use non-volatile memory, e.g., EEPROM, Flash memory, etc., to store the authorized user information.

When an administrator wants to add or delete a user, only the CMM need be updated instead of having to update each blade BMC. Each user may have a privilege list for any or all of the blades in the blade server system. This privilege list may define which user(s) apply to which blades, input-output (I/O) modules, and/or chassis. The privilege list may comprise a bit map with an appropriate number of bits for each piece of equipment and access level thereto. A BMC may authenticate an ACTIVE DIRECTORY® user through the CMM if this user's name includes domain information.

It is contemplated and within the scope of this disclosure that rack mounted monolithic servers (individual standalone boxes) may use a common rack management system (RMS) that may function similarly to the CMM as described herein. Each BMC in a monolithic server may authenticate a user with the RMS through an out-of-band management network using, for example but not limited to, a simple user authorization retrieval command, e.g., IPMI Get Auth Code command.

According to a specific example embodiment of this disclosure, an information handing system may comprise a method for authenticating baseboard management controller (BMC) user requests in a blade server system, comprising the steps of: receiving a request from a user to access a blade server in a blade server system, wherein the blade server system comprises a plurality of blade servers and each of the plurality of blade servers has a baseboard management controller (BMC); requesting verification of the user by the BMC of the blade server to a chassis management module (CMM); verifying the user with the CMM; authorizing the request by the user with the BMC if the user is verified by the CMM; and performing the authorized request by the blade server.

According to another specific example embodiment of this disclosure, an information handing system may comprise a method for authenticating baseboard management controller (BMC) user requests in a server system, comprising the steps of: receiving a request from a user to access a server in a server system, wherein the server system comprises a plurality of servers and each of the plurality of servers has a baseboard management controller (BMC); requesting verification of the user by the BMC of the server to a rack management system (RMS); verifying the user with the RMS; authorizing the request by the user with the BMC if the user is verified by the RMS; and performing the authorized request by the server.

According to yet another specific example embodiment of this disclosure, an information handing system may comprise a blade server system having central verification of users making requests thereto, said blade server system comprising: a plurality of blade servers, each of the plurality of blade servers having a baseboard management controller (BMC); and a chassis management module (CMM) coupled to each of the BMCs; wherein when a request is received from a user to access a one of the plurality of blade servers, the BMC of the one of the plurality of blade servers requests verification of the user by the CMM; and wherein if the CMM verifies the user then the BMC of the one of the plurality of blade servers authorizes the request by the user and the one of the plurality of blade servers performs the request.

BRIEF DESCRIPTION OF THE DRAWINGS

A more complete understanding of the present disclosure thereof may be acquired by referring to the following description taken in conjunction with the accompanying drawings wherein.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of specific example embodiments are schematically illustrated. Like elements in the drawings will be represented by like numbers, and similar elements will be represented by like numbers with a different lower case letter suffix.

Figure 1:
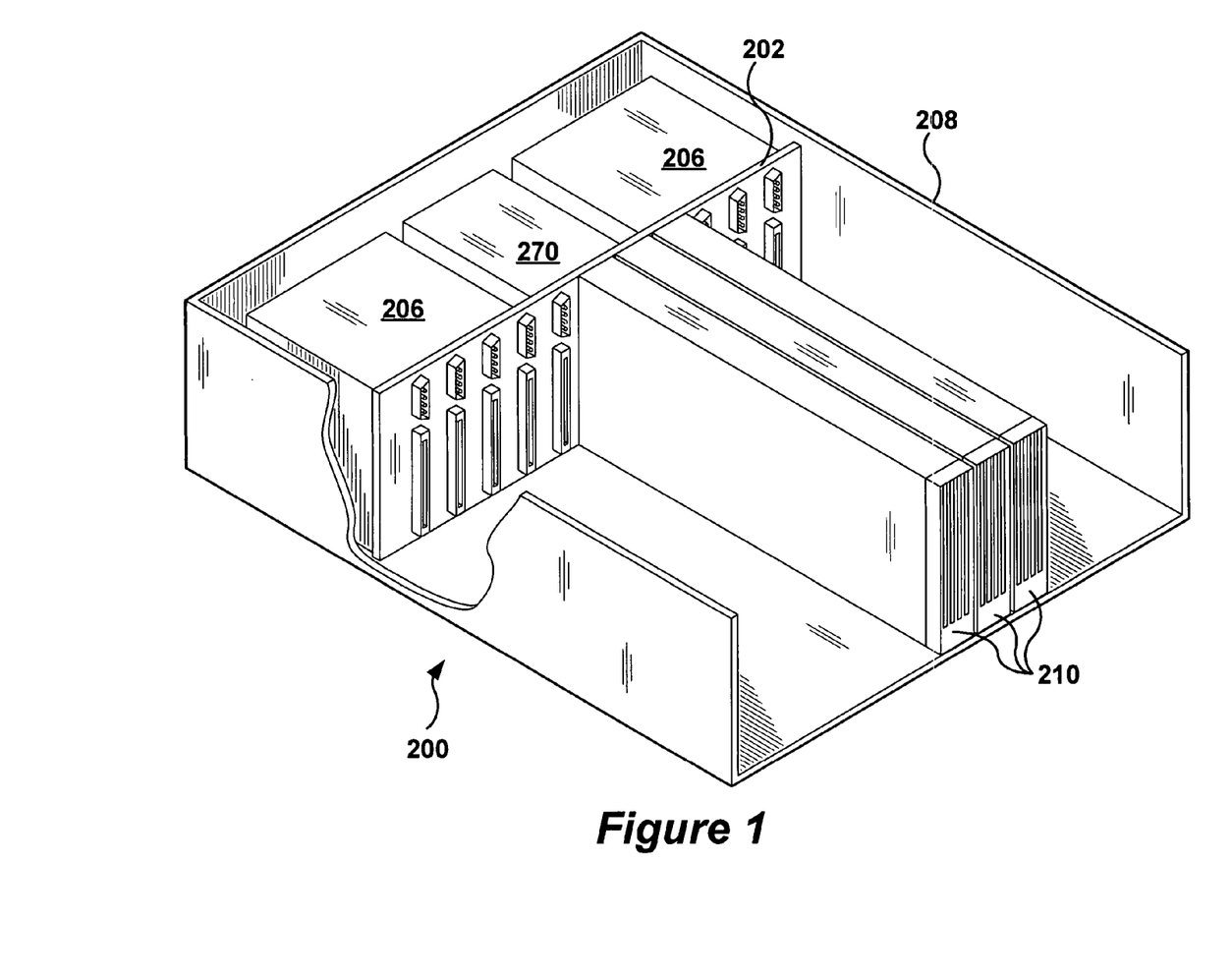
FIG. 1 is a schematic perspective view of a high density information handling blade server system, according to a specific example embodiment of the present disclosure.

Referring to FIG. 1, depicted is a schematic perspective view of a high density information handling blade server system, according to a specific example embodiment of the present disclosure. The information handling server system, generally represented by the numeral 200, comprises at least one blade server module (BSM) 210, a power distribution board (PDB) 202, at least one power supply unit (PSU) 206, and a chassis management module (CMM) 270. In certain embodiments, one example of an information handling server system 200 includes a high density server system 200 that may form a part of a component rack system (not expressly shown). Typically, the high density server system 200 may include an enclosure or chassis 208 in which the at least one PSU 206, CMM 270, PDB 202 and the at least one BSM 210 may be enclosed therein. Each BSM 210 may include a blade management controller (BMC) 212 (see FIG. 2).

Although FIG. 1 depicts a mid-plane PDB 202 as being placed between CMM 270 and the at least one BSM 210, the PDB 202 may be located anywhere in the information handling system 200, even external to the chassis 208. In alternate embodiments, the PDB 202 may be located along the back of the information handling server system 200 and may be referred to as a power distribution back-plane (not shown).

The high density server system 200 may be coupled to other computer components such as keyboards, video displays and pointing devices (not expressly shown). Typically, the information handling system 200 may include more than one PSU 206 such that a redundant power source may be provided. The PSU 206 may supply an output, e.g., an electrical voltage(s) for the at least one BSM 210. Generally, the PSU 206 output is coupled through the PDB 202 for distribution to the at least one BSM 210.

Figure 2:
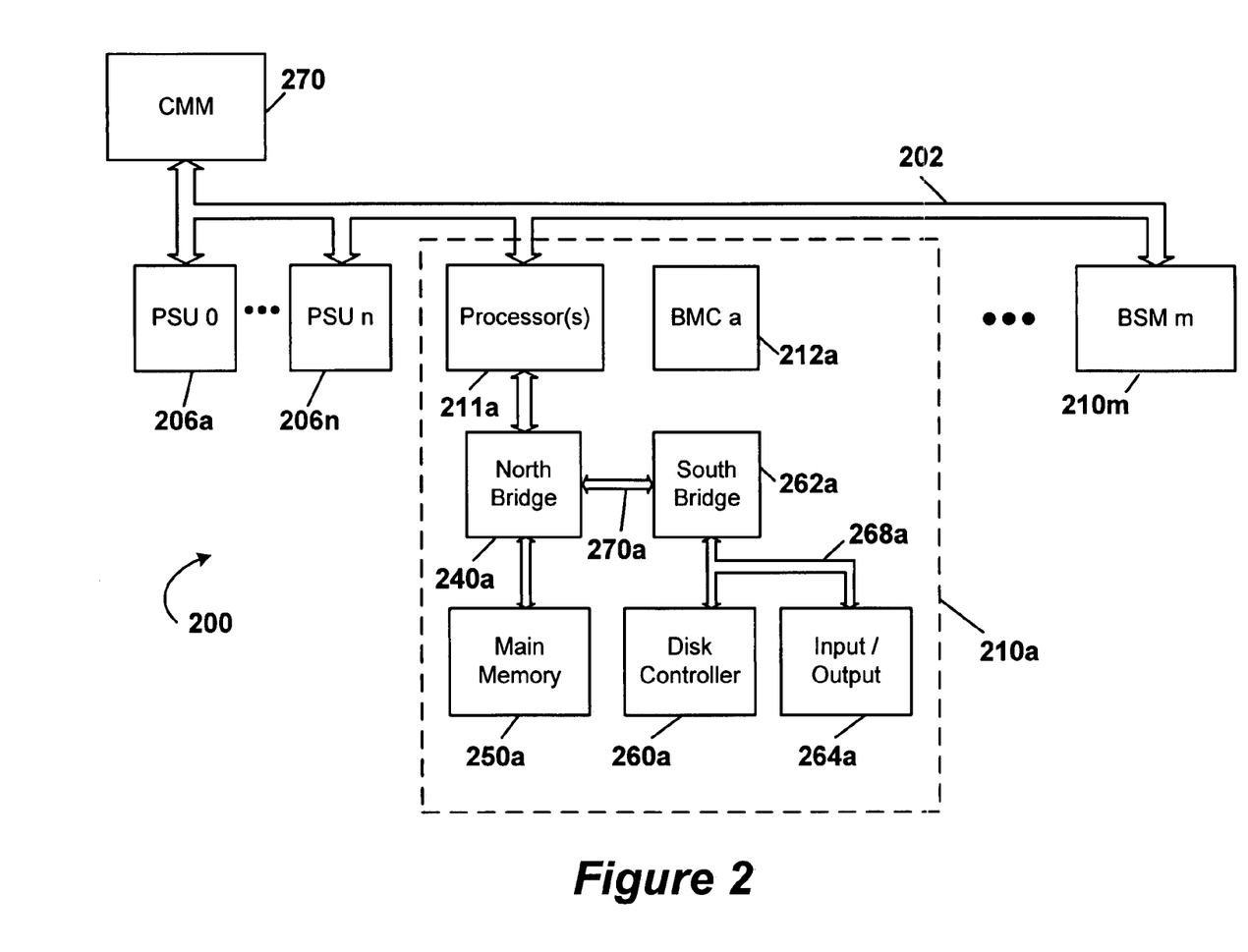
FIG. 2 is an information handling blade server system having electronic components mounted on at least one printed circuit board (PCB) (motherboard not shown) and communicating data and control signals therebetween over signal buses.

Referring to FIG. 2, depicted is an information handling blade server system having electronic components mounted on at least one printed circuit board (PCB) (motherboard not shown) and communicating data and control signals therebetween over signal buses. In one example embodiment, the information handling server system is a computer blade server system. The information handling server system, generally referenced by the numeral 200, may comprise one or more blade server modules (BSMs) 210a-210m. For each of the blade server modules (BSMs) 210a-210m (for illustrative purposes only components for BSM 210a are shown) there may be a processor(s) 211 a, a north bridge 240a, which may also be referred to as a memory controller hub or a memory controller that is coupled to a main system memory 250a, and the blade management controller (BMC) 212a. The north bridge 240a is coupled to the processor(s) 210a via the host bus 220a. The north bridge 240a is generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 240a. The chip set may also be packaged as an application specific integrated circuit (ASIC). The north bridge 240a typically includes functionality to couple the main system memory 250a to other devices within the information handling system 100. Thus, memory controller functions such as main memory control functions typically reside in the north bridge 240a. In addition, the north bridge 240a provides bus control to handle transfers between the host bus 220a and a second bus(es), e.g., PCI bus 270a. A third bus(es) 268a may also comprise other industry standard buses or proprietary buses, e.g., ISA, SCSI, I²C, SPI, USB buses through a south bridge (s) (bus interface) 262a.

Figure 3:
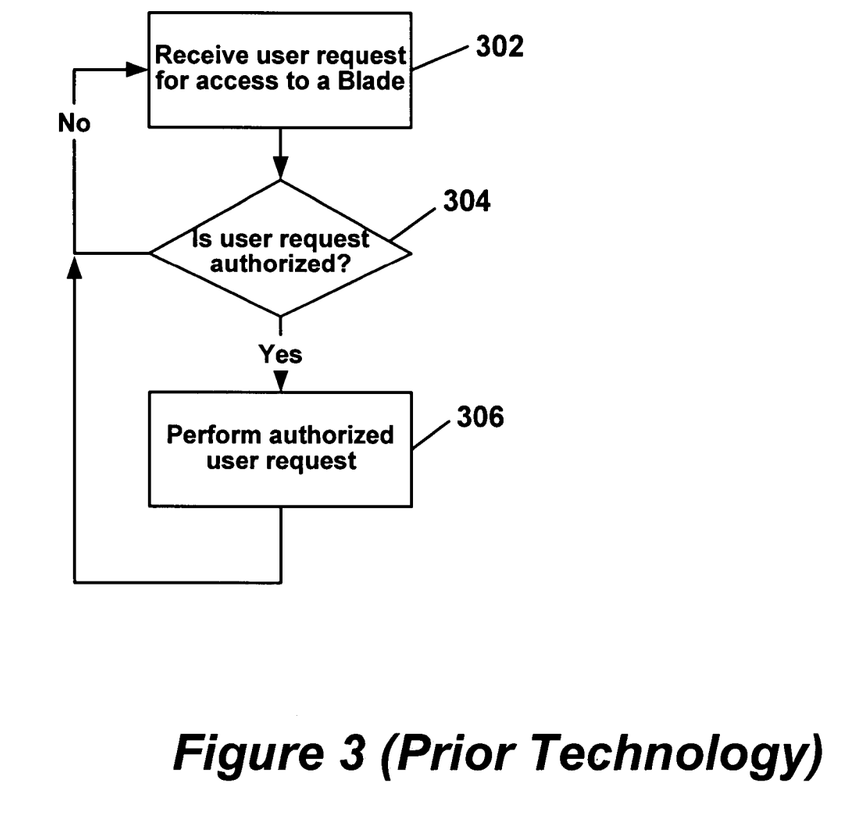
FIG. 3 is a schematic flow diagram of a prior technology sequence of steps for authorizing a user request to a blade of a blade server system.

Referring now to FIG. 3, depicted is a schematic flow diagram of a prior technology sequence of steps for authorizing a user request to a blade of a blade server system. In step 302, a user requests access to a blade in a blade server system. In step 304 the BMC of the requested blade verifies whether the user is authorized to access the blade. If the user access is authorized then the user request is performed by the blade. Each BMC of a respective blade server must have all of the access authorization information for all of the users that may access the respective blade. This may require a great deal of non-volatile memory storage capacity for each BMC and authorization information for each user must be duplicated in each of the BMCs that the user(s) is authorized to access.

Figure 4:
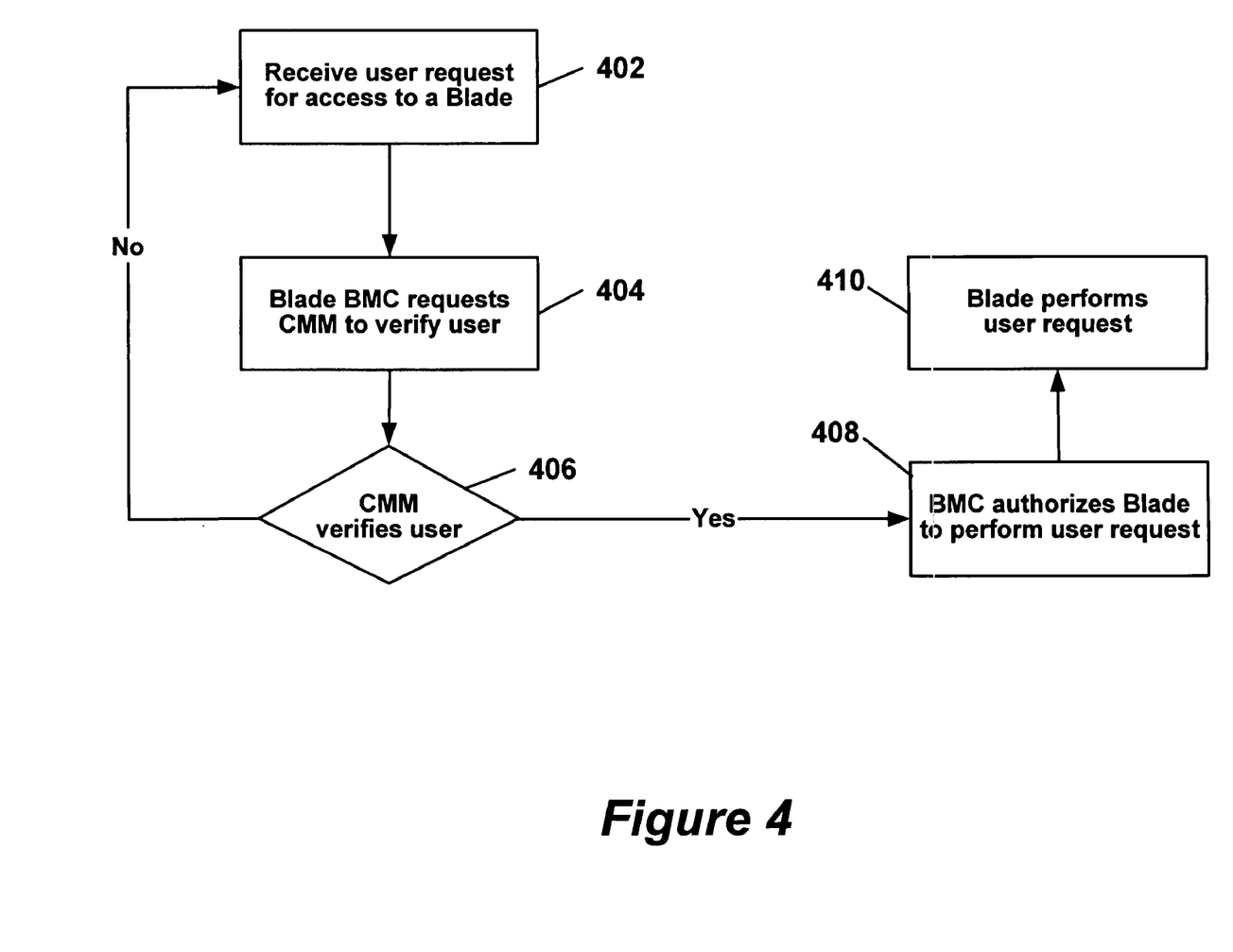
FIG. 4 is a schematic flow diagram of a sequence of steps for authorizing a user access request to a blade by having the BMC of the requested blade obtain verification from a chassis management module (CMM) that the user has authorization to make the requested access to the blade, according to a specific example embodiment of the present disclosure.

Referring now to FIG. 4, depicted is a schematic flow diagram of a sequence of steps for authorizing a user access request to a blade by having the BMC of the requested blade obtain verification from a chassis management module (CMM) that the user has authorization to make the requested access to the blade, according to a specific example embodiment of the present disclosure. In step 402, a user requests access to a blade 210 in a blade server system 200. In step 404 the BMC 212 of the requested blade 210 requests the CMM 270 to verify that the user is authorized to access the blade 210. In step 406, if the user access is verified in the CMM 270 then in step 408 the BMC 212 authorizes the respective blade 210 to perform the user request. In step 410 the respective blade 210 performs the user request. Each BMC 212 only needs to request authorization from the CMM 270 of a user request for a particular blade 210. No user authorization information has to be stored in each BMC 212, only in the CMM 270 which is in common with and accessible to all of the BMCs 212 of the blade server system 200. All user access authorizations may be located in the CMM 270, thus reducing the amount of memory storage required in each of the BMCs 212.

Figure 5:
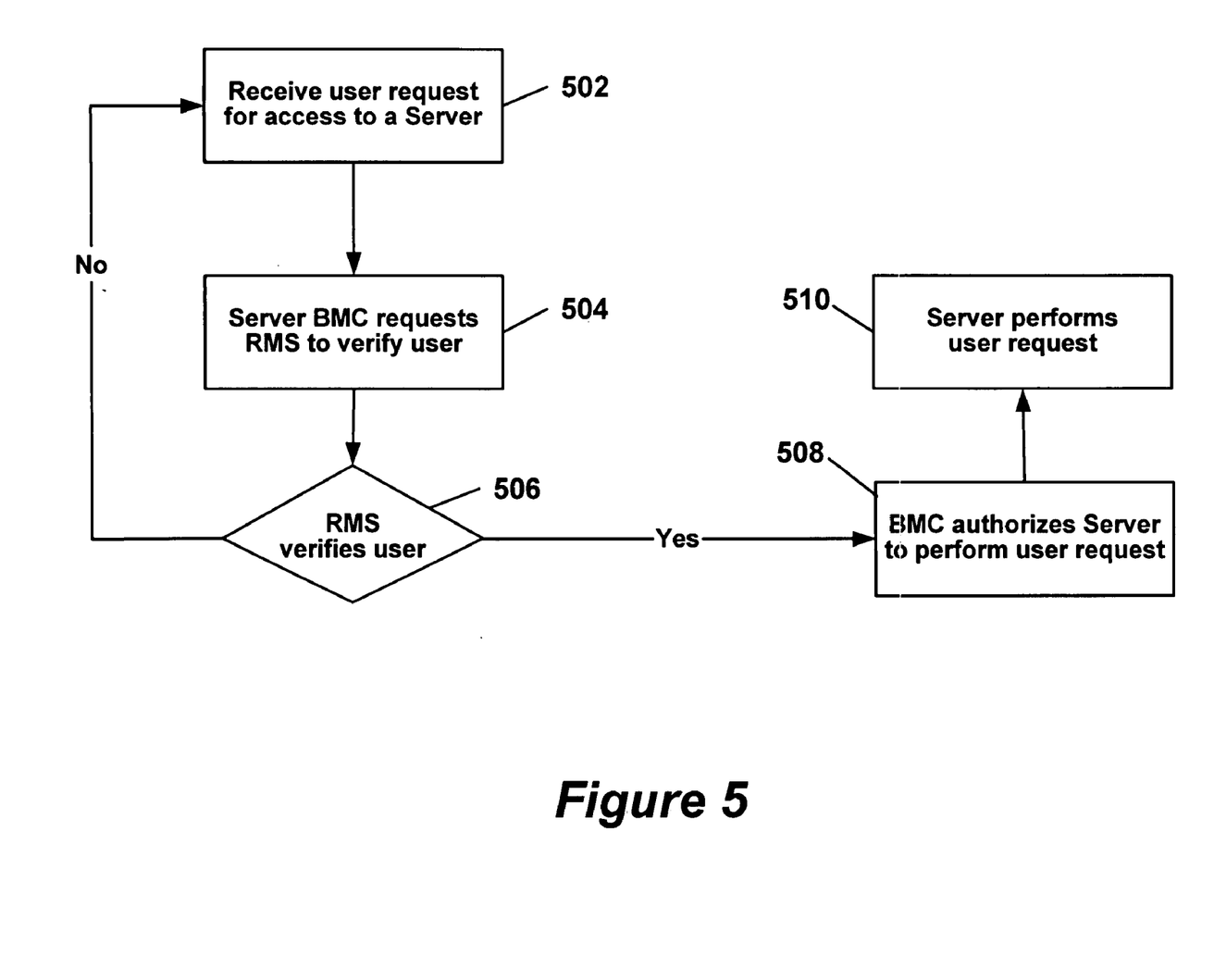
FIG. 5 is a schematic flow diagram of a sequence of steps for authorizing a user access request to a server by having the BMC of the requested server obtain verification from a rack management system (RMS) that the user has authorization to make the requested access to the server, according to a specific example embodiment of the present disclosure.

Referring now to FIG. 5, depicted is a schematic flow diagram of a sequence of steps for authorizing a user access request to a server by having the BMC of the requested server obtain verification from a rack management system (RMS) that the user has authorization to make the requested access to the server, according to a specific example embodiment of the present disclosure. In step 502, a user requests access to a monolithic server. In step 504 the BMC of the requested server requests the RMS to verify if the user is authorized to access the server. In step 506, if the user access is verified in the RMS then in step 508 the BMC authorizes the respective server to perform the user request. In step 510 the server performs the user request. Each BMC only needs to request authorization from the RMS of a user request for a particular server. No user authorization information has to be stored in each BMC, only in the RMS which is in common with and accessible to all of the BMCs of the server system. All user access authorizations may be located in the RMS, thus reducing the amount of memory storage required in each of the BMCs.

It is contemplated and within the scope of this disclosure that advanced authorization techniques, e.g., ACTIVE DIRECTORY®, may be utilized since all user verification and authorized access data may reside in the CMM or RMS.

Figure 6:
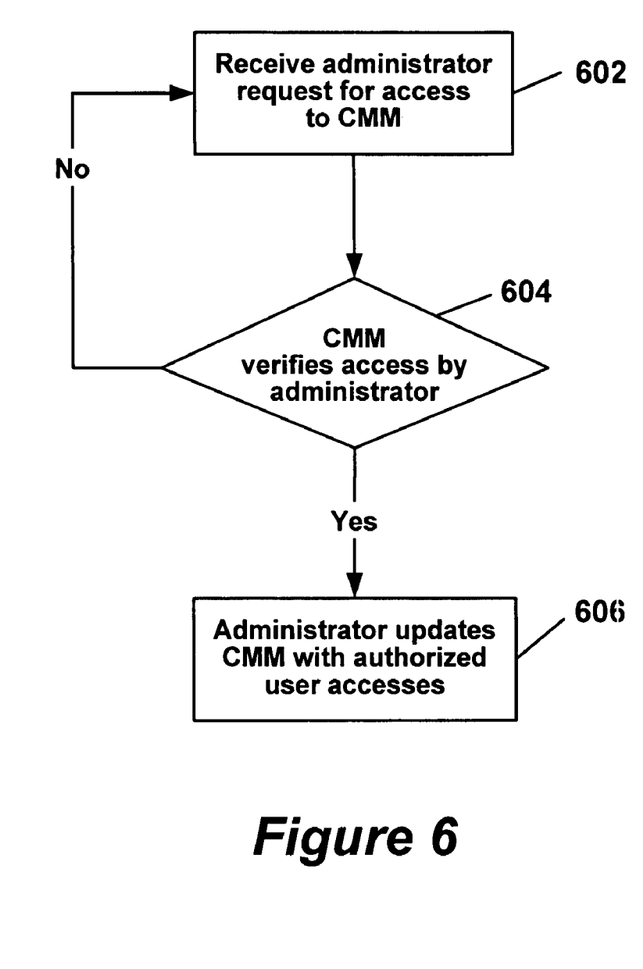
FIG. 6 is a schematic flow diagram of a sequence of steps for authorizing an administrator access to the chassis management module (CMM) and for updating a list of authorized user accesses to blades of the blade server system, according to a specific example embodiment of the present disclosure.

Referring now to FIG. 6, depicted is a schematic flow diagram of a sequence of steps for authorizing an administrator access to the chassis management module (CMM) and for updating a list of authorized user accesses to blades of the blade server system, according to a specific example embodiment of the present disclosure. In step 602, an administrator requests access to the CMM 270. In step 604, the CMM 270 verifies that the administrator access is authorized. If the administrator access is found to be authorized in step 604, then in step 606 the administrator may update the list of authorized user accesses stored in the CMM 270.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for authenticating baseboard management controller (BMC) user requests in a blade server system, said method comprising the steps of:

receiving at a blade server in the blade server system a request from a use, wherein the user is seeking to access the blade server, wherein the user is unverified at the time the request is received, wherein the blade server system comprises a plurality of blade servers and each of the plurality of blade servers has a baseboard management controller (BMC), wherein the blade server is capable of being accessed at the time the request is received;

after receiving the request, requesting verification of the user by the BMC of the blade server to a chassis management module (CMM);

verifying the user with the CMM, wherein the CMM includes a list of authorized users;

authorizing the request by the user with the BMC if the user is verified by the CMM; and performing the authorized request by the blade server.

2. The method according to claim 1, wherein the step of verifying the user includes the step of issuing a user authorization retrieval command to the CMM.

3. The method according to claim 2, wherein the step of issuing a user authorization retrieval command comprises the step of issuing an IPMI Get Auth Code command.

4. The method according to claim 1, wherein the list of authorized users includes authorized access to which ones of the plurality of blade servers, and input-output modules thereof.

5. The method according to claim 1, further comprising the step of verifying advanced user authentication with the CMM.

6. A method for authenticating baseboard management controller (BMC) user requests in a server system, said method comprising the steps of:

receiving at a server in the server system a request from a user, wherein the user is seeking to access the server, wherein the user is unverified at the time the request is received, wherein the server system comprises a plurality of servers and each of the plurality of servers has a baseboard management controller (BMC), wherein the blade server is capable of being accessed at the time the request is received;

after receiving the request, requesting verification of the user by the BMC of the server to a rack management system (RMS);

verifying the user with the RMS, wherein the RMS includes a list of authorized users;

authorizing the request by the user with the BMC if the user is verified by the RMS; and performing the authorized request by the server.

7. The method according to claim 6, wherein the step of verifying the user includes the step of issuing a user authorization retrieval command to the RMS.

8. The method according to claim 7, wherein the step of issuing a user authorization retrieval command comprises the step of issuing an IPMI Get Auth Code command.

9. The method according to claim 6, wherein the list of authorized users includes authorized access to which ones of the plurality of servers, and input-output modules thereof.

10. A blade server system having central verification of users making requests thereto, said system comprising:

a plurality of blade servers, each of the plurality of blade servers having a baseboard management controller (BMC); and a chassis management module (CMM) coupled to each of the BMCs;

wherein when a request is received at one of the plurality of blade servers from a an unverified user seeking to access the one of the plurality of blade servers, the BMC of the one of the plurality of blade servers requests verification of the unverified user by the CMM, wherein the CMM includes a list of authorized users;

wherein the one of the plurality of blade servers is capable of being accessed at the time the request is received; and wherein if the CMM verifies the user then the BMC of the one of the plurality of blade servers authorizes the request and the one of the plurality of blade servers performs the request.

11. The system according to claim 10, wherein the CMM receives a user authorization retrieval command to verify the user.

12. The system according to claim 11, wherein the user authorization retrieval command comprises an IPMI Get Auth Code command.

13. The system according to claim 10, wherein the list of authorized users includes authorized access to which ones of the plurality of blade servers, and input-output modules thereof.

14. The system according to claim 10, wherein the plurality of authorized users are stored in a non-volatile memory of the CMM.

15. The system according to claim 14, wherein the non-volatile memory is an electrically erasable and programmable memory (EEPROM).

16. The system according to claim 14, wherein the non-volatile memory is a Flash memory.

* * * * *